(No Model.)
C. BUSH.
POT FOR MOLTEN METAL.
No. 503,783. Patented Aug. 22, 1893.
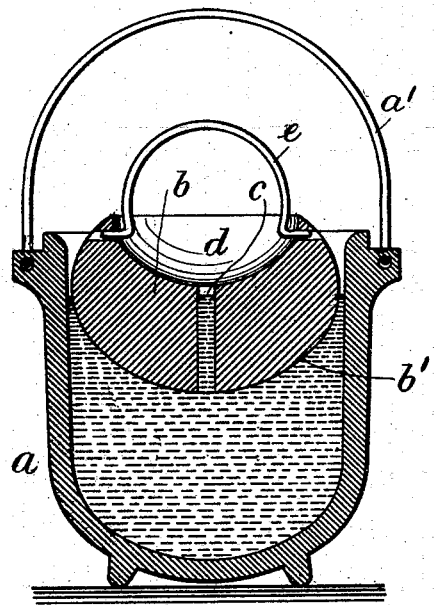
Fig. 1.
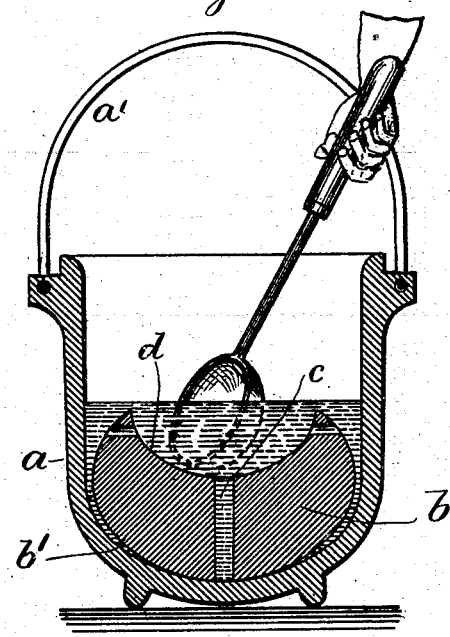
Fig. 2.
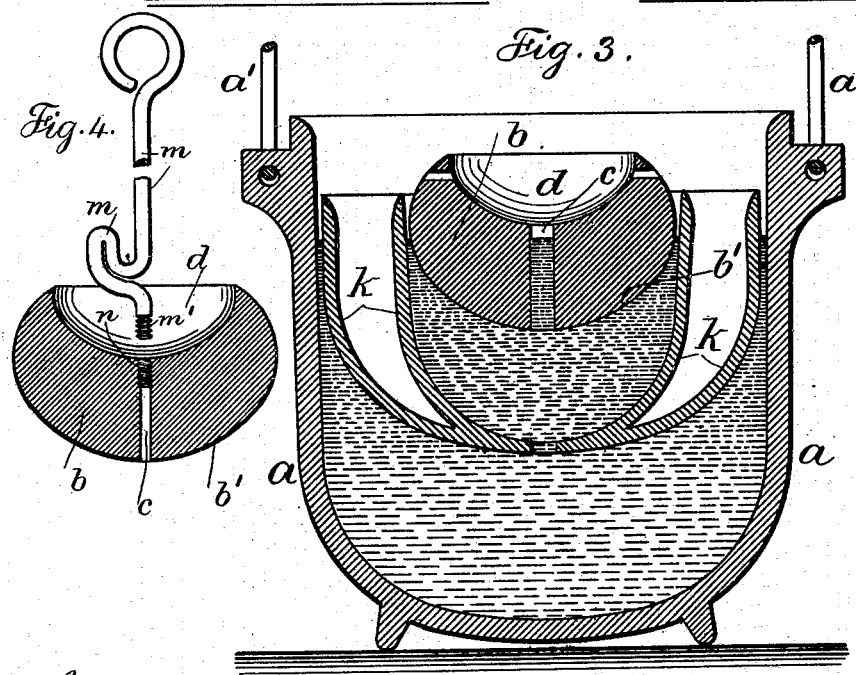
Fig. 4.
Fig. 3.
Witnesses:
J. Staib
Chas H. Smith
Inventor
Charles Bush
per Lemuel W. Serrell
Atty.

UNITED STATES PATENT OFFICE.

CHARLES BUSH, OF NEWBURG, NEW YORK.

POT FOR MOLTEN METAL.

SPECIFICATION forming part of Letters Patent No. 503,783, dated August 22, 1893.

Application filed September 14, 1892. Serial No. 445,838. (No model.)

*To all whom it may concern:*

Be it known that I, CHARLES BUSH, a citizen of the United States, residing at Newburg, in the county of Orange and State of New York, have invented a new and useful Improvement in Pots for Molten Metal, of which the following is a specification.

My invention relates especially to pots for molten lead and solder such as are usually employed by plumbers and tinsmiths. In these pots as heretofore constructed, the surface of the molten metal was continually oxidized by exposure to the air, and this oxidized layer had to be removed or pushed aside to give access to the clean fused metal beneath. This layer of oxidized metal kept constantly increasing and was eventually removed and thrown away.

The object of my invention is to overcome this difficulty and reduce the liability of oxidation to a minimum.

In carrying out my invention I employ in combination with a melting pot a floating seal, composed of metal or other suitable material of a lighter specific gravity and a higher melting point, for instance, iron or other metal or clay. This floating seal is circumferentially slightly smaller than the inside of the melting pot to insure free vertical movement. It is convex on the under side to conform approximately to the bottom of the pot. It is concave on the upper side to form a receptacle from which the molten metal can be dipped with a ladle when the floating seal is pushed down into the pot. It is also provided with a perforation or channel through which the molten metal flows upwardly into the concave portion of the seal when depressed. The seal floats on the surface of the molten metal and entirely covers and protects the same except to an unappreciable extent at a very thin line around the float, and at the perforation, and no matter how the seal may be tipped or turned in pushing down to remove molten metal said seal by its shape and buoyancy will come up, right side up, as soon as released.

In the drawings Figure 1. is a vertical section of a melting pot and my floating seal. Fig. 2. is a vertical section of the same, in the act of dipping the molten metal. Fig. 3. is a vertical section of a modification, and Fig. 4. is a view of the lifting or pot hook.

The melting pot $a$, is of usual construction, and provided with a bail $a'$. The sides of the pot $a$, above the rounded bottom taper slightly in an upward direction. The floating seal is represented at $b$, with a convex under side $b'$, conforming approximately to the rounded bottom of the melting pot. A central perforation or channel at $c$, is provided through the said floating seal and a depression or concave $d$, is provided in the upper surface of the floating seal, the same forming a receptacle for the molten metal, and from which it is dipped by hand ladle as shown in Fig. 2, when the floating seal is pushed down into the pot. The act of pushing the seal down into the pot of melted metal causes the metal to flow up the opening or channel $c$, into the receptacle or concavity $d$, and when the ladle is removed and the seal released it rises, the metal returning as it came, and the floating seal by its lighter specific gravity remaining upon the surface of the molten metal and protecting it from the oxidizing influence of the atmosphere. The act of dipping the metal by ladle is momentary, and the seal rises and rights itself as soon as released. Therefore there is not time for the air to act on the metal.

I prefer to employ (see Fig. 4) the usual pot hook $m$, the lower end of which is screw threaded at $m'$, to screw into the threaded upper end $n$, of the perforation in lifting the floating seal $b$, but I may perforate opposite sides of the upper edge of the floating seal and provide a bail $e$, which when desired can be sprung into place to lift the seal out of the melting pot.

The modification shown in Fig. 3. consists in the employment of a secondary floating seal $k$, of hollow material with a perforation in the lower part and located between the first seal $b$. and the inner surface of the melting pot. This is useful where large bodies of molten metal in large pots are employed in such work as laying sewer and gas pipes in cities, and where the floating seal if proportionately large to the pot would be unwieldy and difficult to handle in use. As shown in Fig. 3. in this case the seal $b$, is of usual size and the molten metal by the depression of this seal is only drawn from the center of the mass.

The seals $b$, and $k$, both settle as the molten metal is withdrawn, and all the metal can be used from the melting pot except the small quantity in the central channel $c$.

The form of the floating seal not only permits the molten-metal to be dipped or ladled out of the depression or concavity $d$, but it floats right side up no matter in what way it may be tipped and being preferably made of iron the lead or solder does not adhere to it and the oxdizing of the air on the molten metal is thus prevented, the metal remaining free and fluid.

The floating seal $b$, may be made hollow if desired, and it may be made of other material or metal than iron, such material or fine clay as is used in crucibles being adapted for the purpose.

I claim as my invention—

1. The combination with a melting pot, of a floating seal adapted to exclude the surface of the melted material from atmospheric action, and having a receptacle in the upper surface from which the melted material can be dipped and a passage way by which the material flows into said receptacle as the seal is depressed substantially as specified.

2. The combination with a melting pot for metal, of a floating seal of metal or other suitable material having a convex under side, and a concave upper side forming a receptacle from which the molten metal is dipped when the seal is pushed down substantially as set forth.

3. The combination with a melting pot for metal having a curved bottom, of a floating seal of metal, or other suitable material having a convex under side conforming approximately to the bottom of the pot, a concave upper side forming a receptacle from which the molten metal is dipped when the seal is pushed down there being a channel through the seal for the molten metal to pass through into the receptacle, substantially as and for the purposes set forth.

4. The combination with a melting pot for metal having a curved bottom, of a floating seal $b$. of metal, or other suitable material having a convex under side $b'$ a depression or concavity $d$, in the upper side forming a receptacle and a channel $c$, through said seal, and an auxiliary floating seal $k$, with a central perforation substantially as and for the purposes set forth.

5. The combination with a melting pot, of a floating seal having a receptacle in the upper surface from which the molten material can be dipped and a channel for supplying such receptacle as the seal is depressed, and an auxiliary floating seal surrounding the said seal and having an open center for the molten material and in which floats the main seal substantially as specified.

Signed by me this 31st day of August, 1892.

CHARLES BUSH.

Witnesses:
CHAS. L. CHATTERTON,
JOHN B. MASON.